April 26, 1932.    G. W. GREENWOOD    1,855,670
PROCESS FOR MANUFACTURING PUFFED CANDY
Filed June 17, 1930
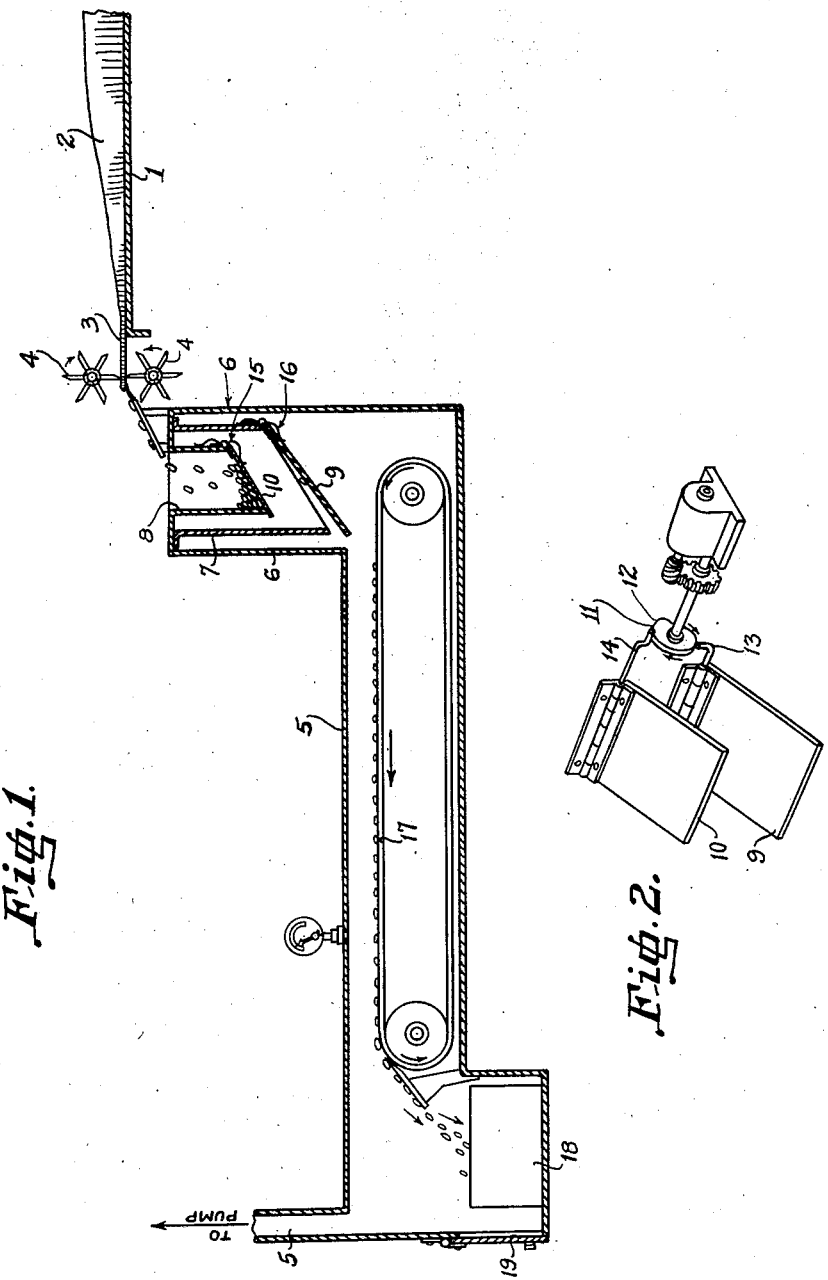
Inventor
G. W. Greenwood
By Mason Fenwick & Lawrence
Attorneys Patented Apr. 26, 1932

1,855,670

UNITED STATES PATENT OFFICE

GEORGE W. GREENWOOD, OF WILMINGTON, DELAWARE, ASSIGNOR TO STEPHEN F. WHITMAN & SON, INC., OF PHILADELPHIA, PENNSYLVANIA, A CORPORATION OF PENNSYLVANIA

PROCESS FOR MANUFACTURING PUFFED CANDY

Application filed June 17, 1930. Serial No. 461,825.

This invention relates to the manufacture of candy and particularly to a process for producing puffed candy, that is to say, expanded aerated candy.

It is known to be quite advantageous in candy making to increase the surface of the candy mass as much as possible, thereby increasing the area of contact of the candy with the mouth tissues so as to facilitate its dissolution in the saliva and thereby to improve its taste. It is also advantageous from the standpoint of manufacture to produce a candy that shall be of relatively light weight.

The puffing or inflation of candy by the use of gas producing chemicals such as soda, is known but such methods have the objection that a part of the chemical may remain undissolved in the batch, impairing the flavor of the candy and perhaps rendering the same unwholesome.

It is also known to produce light foraminous candy sponge by the extrusion of the plastic batch through a die constructed to produce tubular interstices in the extruded candy. Such methods while successfully practiced produce foramina of relatively gross size and spaced relatively great distances apart, which even though the foraminous mass is subsequently pulled down to reduce size is still incapable of being improved to the point where the candy will consist of a homogeneous mass of almost microscopic candy particles and air cells of such uniform and fine texture as to give the maximum of melting effect and taste when brought into contact with the moist mouth tissues as well as the minimum of weight for a given mass of candy.

The present invention in its broadest aspect is the process for producing puffed candy involving two essential steps, first the incorporation or entraining of air in finely divided form into the batch of plastic candy, and secondly, the expanding of the incorporated or entrained air within the candy by subjecting the candy while still plastic to a reduced pressure. If the incorporation of the air into the batch has been done at atmospheric pressure, the expansion or puffing of the candy will be done in vacuo. If on the other hand the entraining of the air has been accomplished under super-atmospheric pressure, then the expansion of the aerated candy may be accomplished by a reduced pressure which may yet be as high as atmospheric pressure or even higher.

The process of my invention may be carried out in several ways, one of which is illustrated diagrammatically in the drawings in which:

Figure 1 represents diagrammatically and in vertical section, a system of apparatus for performing the process; while Figure 2 is a perspective view of the doors controlling the vacuum retaining hoppers.

Referring now in detail to the figures, the numeral 1 represents a table or other suitable support on which is seen a batch 2 of candy which has been previously pulled, kneaded or otherwise agitated so as to incorporate in finely divided portions or bubbles a body of air or other inert gas. This batch of candy is shown as being pulled out into a long narrow strip 3 adapted to be cut off into suitably sized pieces or drops. It is to be understood, of course, that the drawing out of the batch or the cutting of the same into the individual pieces is only one of a number of equivalent adaptations to which the process may be applied. The cutting mechanism is conventionally shown at 4.

A low pressure chamber 5 is provided in which a pressure is maintained by a suitable vacuum pump not shown, but connected to an outlet conduit 5', lower than the pressure of the air which was incorporated or entrained into the batch 2. If the batch 2 is at atmospheric pressure a vacuum will be maintained in the chamber 5 and for convenience hereinafter it will be referred to as a vacuum chamber. A vacuum trap 6 of any suitable type and construction may be provided at the inlet end of the vacuum chamber. The vacuum trap here shown comprises two hoppers 7 and 8, one extending into the other and being provided at their bases with doors 9 and 10, respectively. These doors are alternately operated by any suitable means such as the cam 11 shown in Figure 2 having an elevation 12 which in turn actuates the cranks 13 and 14 which oscillate the doors. When the door 9 is open the door 10 is closed, said doors being biased in a closing direction by means such as the springs 15 and 16. Pieces of candy cut off by the cutter 4 drop successively into the hopper 8 and then into the hopper 7, one of the doors being closed while the other is open so as to maintain the vacuum. Since the vacuum pump is presumed to operate continuously, absolute tightness of the doors of the vacuum trap is not essential.

A conveyor 17 is arranged in a substantially horizontal position within the vacuum chamber and the aerated candy pieces fall upon the conveyor adjacent one end and are carried to the other end, at which point they may fall into a suitable receptacle 18. A door 19 is shown giving access to the receptacle for its removal. It is assumed that the candy pieces enter the hoppers and land upon the end of the conveyor adjacent thereto, while in plastic state, being subjected to vacuum just as soon as they enter the vacuum chamber. Due to the pressure differential the entrained or incorporated air bubbles within the candy pieces are expanded puffing the candy to several times its normal bulk. By the time the candy pieces have traversed the conveyor they have cooled off sufficiently while still in vacuo to maintain their shape.

It is of course, to be understood that the process may be carried out by any desired combination of mechanical devices without transcending the scope of the invention.

What I claim is:

1. Process for puffing candy comprising: agitating a batch of plastic sugar candy so as to incorporate inert gas in finely divided state into said batch, cutting pieces of desired size from the batch; and subjecting the pieces unrestrictedly to expansion under reduced pressure until the candy takes a permanent set or shape.

2. Process for puffing candy comprising: pulling a batch of plastic sugar candy so as to incorporate air or other inert gas in finely divided state throughout the mass of said batch, and subjecting the aerated candy while still plastic to unrestricted expansion under reduced pressure until the candy takes a permanent set or shape.

In testimony whereof I affix my signature.

GEORGE W. GREENWOOD.